US005278907A

United States Patent [19]

Snyder et al.

[11] Patent Number: 5,278,907

[45] Date of Patent: Jan. 11, 1994

[54] ANALOG SCRAMBLING WITH CONTINUOUS SYNCHRONIZATION

[75] Inventors: Kenneth L. Snyder, Elmwood; Ronald B. Kabler, Lincoln, both of Nebr.

[73] Assignee: Transcrypt International, Inc., Lincoln, Nebr.

[21] Appl. No.: 24,408

[22] Filed: Mar. 1, 1993

[51] Int. Cl.[5] .......... H04L 9/00

[52] U.S. Cl. .......... 380/48; 380/19; 375/94

[58] Field of Search .......... 380/9, 19, 48; 375/94, 375/97

[56] References Cited

U.S. PATENT DOCUMENTS 5,220,584 6/1993 Burns .......... 375/94

OTHER PUBLICATIONS

T. E. Mailey, "How Scramblers Protect Mobile Communications", Cellular & Mobile International, Spring 1992.

E. F. Johnson Company, "Multi-Net Application Note", 1991.

Motorola Semiconductor Technical Data, "Technical Summary 8-Bit Microcontroller Unit", Motorola, Inc. 1989.

D. J. McKernan and Bill Scott, "A Rolling Code Scrambler Gathers Diverse Functions", Mobile Radio Technology, Jul., 1989.

Steve Kelley and Hank Wallace, "Split-band Scrambling Furnishes Voice Security", Mobile Radio Technology, 1988.

*Primary Examiner*—David C. Cain

*Attorney, Agent, or Firm*—Zarley, McKee, Thomte, Voorhees & Sease

[57] ABSTRACT

A device and method for scrambling and de-scrambling audio and voice communications including radio, cellular telephone, and conventional telephone communication. The audio communication can be scrambled using, for example, time varying pseudo-random spectral modification. Continuous data containing synchronization information is transmitted with the scrambled signal to eliminate time lags that occur with synchronization bursts and without detrimentally affecting audio quality.

46 Claims, 4 Drawing Sheets

ANALOG SCRAMBLING WITH CONTINUOUS SYNCHRONIZATION

BACKGROUND OF THE INVENTION

A. Field of the Invention

The present invention relates to communication systems, and in particular, to scrambled voice communications.

B. Problems in the Art

Radio frequency communication is proliferating. Examples include overland delivery systems, law enforcement and military networks, dispatch systems (e.g. taxis), inter-warehouse communication, and in-house security. The ability to wirelessly communicate over distances is advantageous and valuable for many applications.

Technology has produced, for example, hand-held battery powered transceivers which provide good audio quality and large area coverage. However, transmissions from these transceivers can be received by third parties.

A problem for a substantial number of radio frequency communication applications is, therefore, lack of privacy. This, in some instances, also involves security considerations.

This problem is widely acknowledged in the art. A variety of attempts have been made to address this problem. One principal method is to modify the radio frequency transmission so that it is unintelligible to eavesdroppers. The terms "encryption" and "scrambling" are used regarding these methods.

A discussion of these terms and some current systems and methods for "encryption" and "scrambling" can be found at, for example: Mailey, T. P. "How Scramblers Protect Mobile Communications", Cellular and Mobile International, Spring 1992 (pages 44-50); Kelley, S., and Wallace , H., "Split-Band Scrambling Furnishes Voice Security", Mobile Radio Technology, May 1988 (pages 18-28); McKernan, E. J. and Scott, B., "A Rolling Code Scrambler Gathers Diverse Functions", Mobile Radio Technology, Jul. 1989 (pages 42-58). The above listed articles are incorporated by reference concerning their background information.

These articles make it clear that extremely high security usually involves digital encryption techniques. The difficulties with these techniques include complexity and cost as well as the need for separate and costly equipment. Audio quality and limitations on distance for such communications may also come into play. The lowest cost and perhaps simplest techniques, such as voice scrambling using frequency inversion, can prevent casual eavesdropping, but those with sufficient skill and equipment can quite easily decode such scrambling methods.

One method which is generally seen as a reasonable compromise is voice scrambling of the analog signal containing the voice, using time-varying pseudo-random spectral modification of the voice signal. Its advantages include a better level of security than simpler frequency inversion techniques, as well as being less costly than digital encryption methods It can also be easily incorporated into many radio transceivers, including retrofitting existing units.

One requirement of such techniques is that there be synchronization between transmitter and receiver to allow scrambled communications to be de-scrambled. For example, before the receiver can decode it must know the scrambling sequence of the transmitter. It also must recheck synchronization or resynchronize from time to time.

This is not a trivial matter. Problems include loss of access to the transmitted signal due to vagaries in the radio frequency channel or interference, or even time delays in initially accessing the transmitted signal (for example, time delays involving cellular telephone voting systems and trunking grouping in multiple channel dispatch systems). The present state of the art therefore primarily uses an initialization packet and thereafter periodic (fixed or randomly spaced) bursts of information that contain synchronization code. These bursts are short broad band signals. Therefore, during the burst, the channel carrying the voice communication is interrupted to send data, including synchronization information. While this method does broadcast synchronization information periodically, the bursts occupy and therefore replace the voice for those periods. Other problems still exist.

First, if the receiver misses the initialization synchronization information, it must wait until the next burst. This time lag may result in loss of critical information. Secondly, if for whatever reason the receiver loses synchronization, a time lag will exist until the next synchronization information is received—again risking loss of information. Third, the use of periodic synchronization codes can affect audio quality. For example, sending entire initialization codes at certain intervals disrupts the audio portion of the signal, therefore substantially reducing audio quality. Also, there are practical limits on how frequently the bursts can be sent. There is therefore room for improvement in the art.

It is therefore a primary object of the present invention to improve over the problems in the art.

Another object of the present invention is to provide effective mid-level security scrambling without substantial negative effect on audio communication quality.

Another object of the present invention is to reduce or eliminate time lags relating to synchronization.

A still further object of the present invention is to provide continuous synchronization information as long as the transmitted signal is present.

Another object of the present invention is to provide immediate entry synchronization and to reduce or eliminate late entry synchronization problems.

Another object of the present invention is to eliminate loss of information.

A still further object of the present invention is to provide a cost effective, economical and efficient system and method of such radio communication.

Another object of the present invention is to provide a system and method which is relatively easily installed in transceivers, receivers, or transmitters, including retrofitting.

These and other objects, features, and advantages of the present invention will become more apparent with reference to the accompanying specification and claims.

SUMMARY OF THE INVENTION

The present invention includes means and method for efficient establishment and maintenance of synchronization in voice communications which are scrambled. A scrambled audio band is combined with a sub-band containing continuous synchronization information. The sub-band can be at any place in band, or in a near side band.

The resulting communication therefore carries continuous synchronization information which does not detrimentally affect or disrupt the audio portion of the communication.

DETAILED DESCRIPTION OF THE PREFERRED EMBODIMENT

A. Overview

Figure 1:
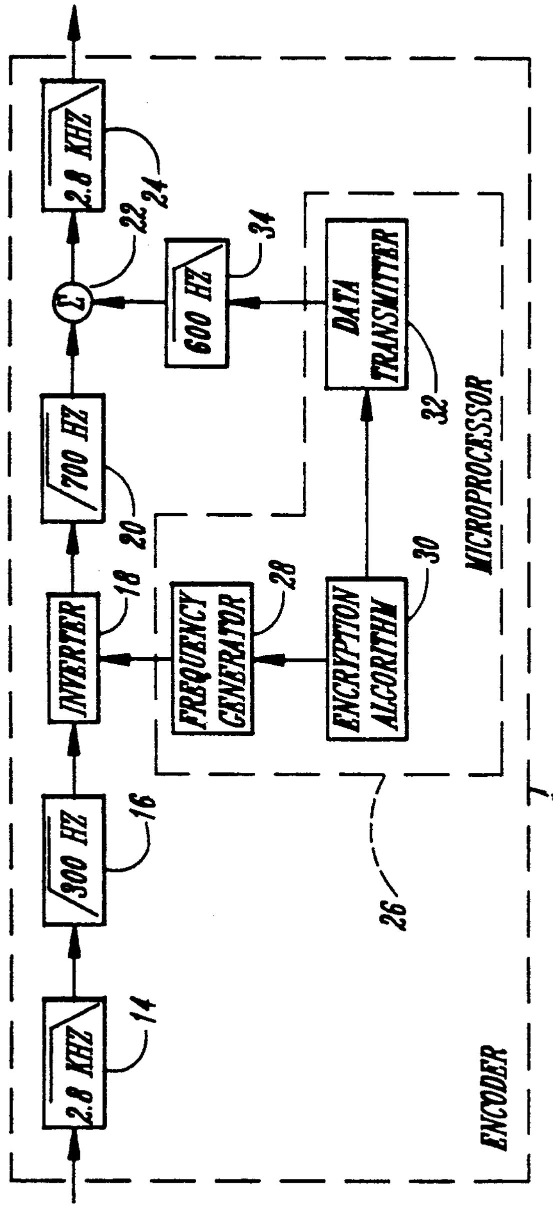
FIG. 1 is a diagrammatic depiction of an encoder portion according to a preferred embodiment of the invention.

To assist in a better understanding of the invention, a preferred embodiment of the invention will now be described in detail. It is to be understood that this is but one form the invention can take and is for purposes of illustration and not limitation.

To assist in this description, reference will be taken to the appended drawings. Reference numbers or letters, or combinations of the same, will be used to indicate specific parts or locations in the drawings. The same parts or locations will be designated by the same reference numerals throughout the drawings unless otherwise indicted.

The present invention is implemented in radio frequency communications systems. This can include receivers, transmitters, or transceivers, or associated communications components. The invention also pertains to such things as cellular telephones, and even conventional telephone communications.

The preferred embodiment of the present invention is implemented in the E. F. Johnson Company Multi-Net TM trunked radio system. The Multi-Net TM system is described in a publication entitled "Multi-Net TM —Application Note", copyright 1991 by E. F. Johnson Co., and which is publicly available and incorporated by reference herein regarding background of the Multi-Net system.

It is to be understood that in the preferred embodiment, the scrambling of the audio signal is accomplished by frequency inversion of the audio band according to pseudo-randomly operated switching instructions. However, the present invention can be utilized with a variety of scrambling techniques. It has been described, for purposes of example with respect to analog scrambling using time-varying pseudo-random spectral modification. The articles cited in the background of the invention contain some discussion of different types of analog scrambling. Others are possible.

In this description, the term "audio band" will generally refer to the portion of the frequency spectrum which is used to transmit voice or audio. Normally audible sound is associated with the range ~20-20,000 Hz. But in the preferred embodiment, as is conventional in RF communications. the audio band is many times more limited as, for example, 300-3000 Hz which is then modulated onto an RF carrier. It is to be understood, however, that even if the audio band were limited to, for example, 1000-2500 Hz, effective voice communication could occur.

B. Structure of Preferred Embodiment

Figure 2:
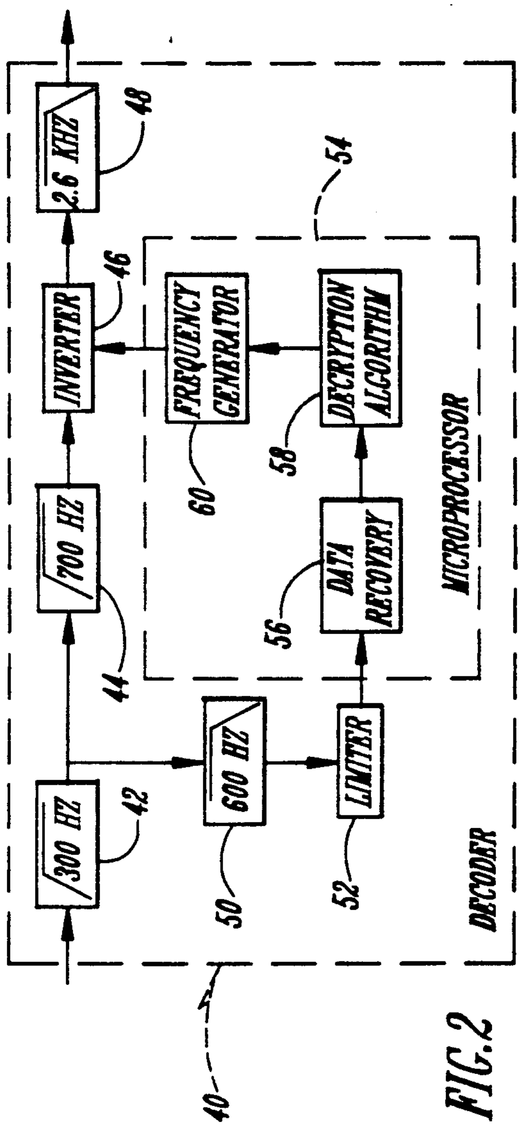
FIG. 2 is a diagrammatic depiction of a decoder portion according to a preferred embodiment of the present invention.

By referring to FIGS. 1 and 2, the structure of the preferred embodiment of the invention, both as an encoding section and a decoding section, is illustrated. It is to be understood that each of the elements are depicted diagrammatically as they are standard items that can be purchased off the shelf from a variety of different manufacturers and/or vendors, and their implementation and use in the disclosed circuitry is well within the skill of those skilled in the art. For example, in the preferred embodiment, all the electrical components were purchased off-the-shelf—many in IC chips that could easily be assembled on a printed circuit board. Also it is to be understood that the preferred embodiment shows a one-half duplex device implementation. It can extend to duplex methods as is within the skill of those skilled in the art. One such way is to use another set of encoder 10/decoder 40 back to back.

(1) Encoder circuitry

FIG. 1 shows encoder 10 according to a preferred embodiment of the present invention. An audio signal generated in a radio frequency transmitter is passed through 2.8 kHz low pass filter 14, 300 Hz high pass filter 16, and inverter 18. The output of inverter 18 passes through 700 Hz high pass filter 20 and then into summer 22. The output of summer 22 passes through 2.8 kHz low pass filter 24 to produce the output of encoder 10.

The microprocessor 26 (in the preferred embodiment Motorolla 8 bit micro controller unit MC68HC705C8) includes a frequency generator 28 and what will be called an encryption algorithm 30. Additionally it includes what will be called a data transmitter 32. The entire encoder 10 circuitry can be realized on a printed circuit board. A programmable memory such as an EEPROM, product designation IC93C46, can also be associated with microprocessor 26, as well as a5-volt voltage regulator (product no. ICLP2951CM). As will be appreciated by those skilled in the art, the microprocessor 26, and resident or external memory such as an EEPROM, can be used in conjunction with software to realize frequency generator 28, encryption algorithm 30 and data transmitter 32.

The microprocessor 26 controls operation of inverter 18 by utilizing encryption algorithm 30 to present instructions to frequency generator 28 to effectively pseudo-randomly switch the inverter 18 to present either the original audio signal or an alternate audio signal that is 180 degrees out of phase with the original audio signal, thus inverting the audio signal which effectively scrambles the audio signal passing through inverter 18.

The microprocessor 26 likewise controls data transmitter 32 by sending information from encryption algorithm 30 that corresponds to information it sends to frequency generator 28. Data transmitter 32 basically modulates data or information onto a 450 Hz radio frequency carrier at 180 baud which is passed through 700 Hz high pass filter 34 into summer 22. In the preferred embodiment the data or information is presented continuously to summer 22 and includes synchronization code.

(2) Decoder

Decoder 40, shown in a preferred embodiment in FIG. 2, can also be realized on a printed circuit board;

and in fact, can be realized in substantially the same circuitry and the same circuit board as encoder 10. A scrambled received signal is directed through 300 Hz high pass filter 42 and then is split in two paths.

What will be called the audio recovery path involves sending the received signal through a 700 Hz high pass filter 44 into inverter 46 and then through 2.6 kHz low pass filter 48 to an output.

What will be called the data recovery path involves sending the received signal first through a 600 Hz low pass filter 50, into limiter 52, and into microprocessor 54.

Microprocessor 54 includes what will be called a data recovery device 56, a decryption algorithm 58, and a frequency generator 60. The low pass filtered and limited signal through the data recovery path essentially is used to recover the modulated data on the 450 Hz carrier, including such things as the synchronization code, which is used by microprocessor 54 to reconstruct the correct inversion sequence to operate inverter 46 in a manner to unscramble or recover the audio portion of the received signal.

It is to be understood that in the preferred embodiment, by correct implementation of the components of encoder 10 and decoder 40, like-functioning components for each circuit can be shared. For example microprocessor 26 and microprocessor 54 can be realized in one microprocessor. Similarly filters such as filters 16, 20, and 34 of encoder 10 can be the same as filters 42, 44, and 50 of decoder 40. The same inverter can comprise inverters 18 and 46.

C. Operation

Typical operation of the preferred embodiment shown in FIGS. 1 and 2 will now be set forth. Reference will also be taken to FIGS. 3(*a*)-(*f*) and 4(*a*)-(*d*), which illustrate in the frequency domain the signal processing through these respective circuits.

Figure 3A:
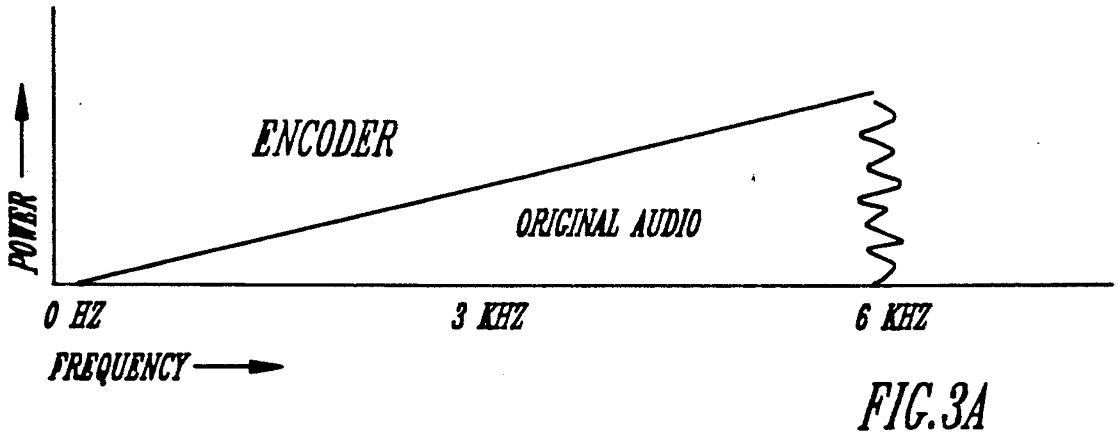
FIGS. 3(*a*)-(*f*) are diagrammatic depictions of signal plots illustrating examples of signal processing in the encoder of FIG. 1.
Figure 3B:
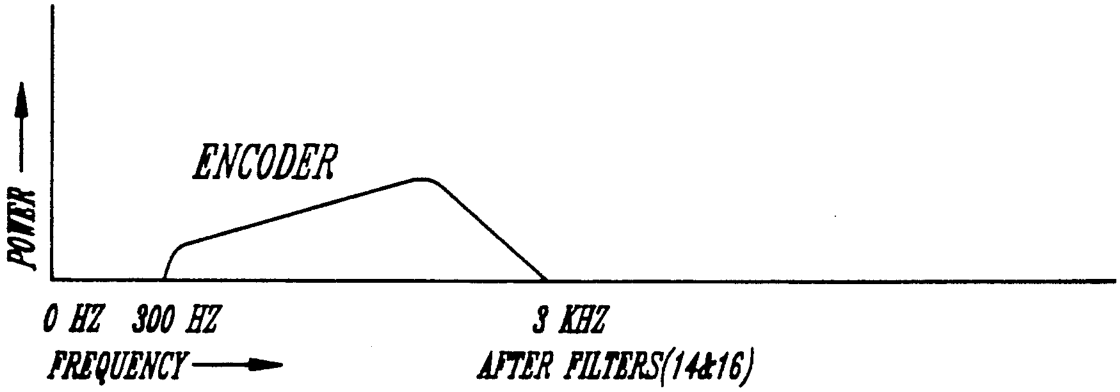

Encoder 10 of FIG. 1 serves to scramble the conventional audio input and additionally merge into the scrambled audio a sub-band carrying continuous synchronization information. The audio to be encrypted (see FIG. 3*a*) enters encoder 10 and is band limited by low pass filter 14 and high pass filter 16 to an approximate band of 300 Hz to 2.8 kHz (see FIG. 3*b*). This band can be considered the original "audio band"; i.e. it presents a conventional band width for voice transmissions commonly used in radio communications. The sub 300 Hz component of the original audio spectrum of FIG. 3*a* is removed in the preferred embodiment to eliminate signals which are used for control in many radio frequency communication systems, but would not be needed.

Figure 3C:
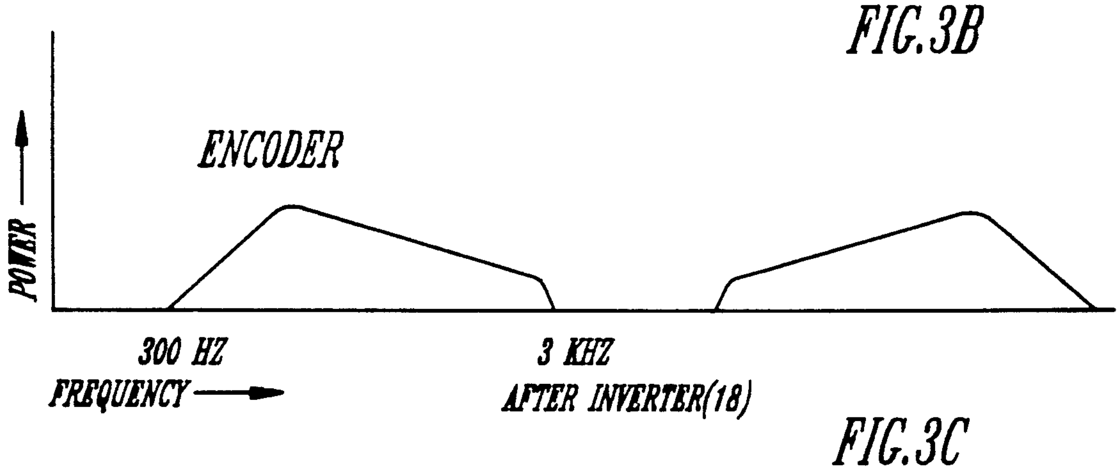
Figure 3D:
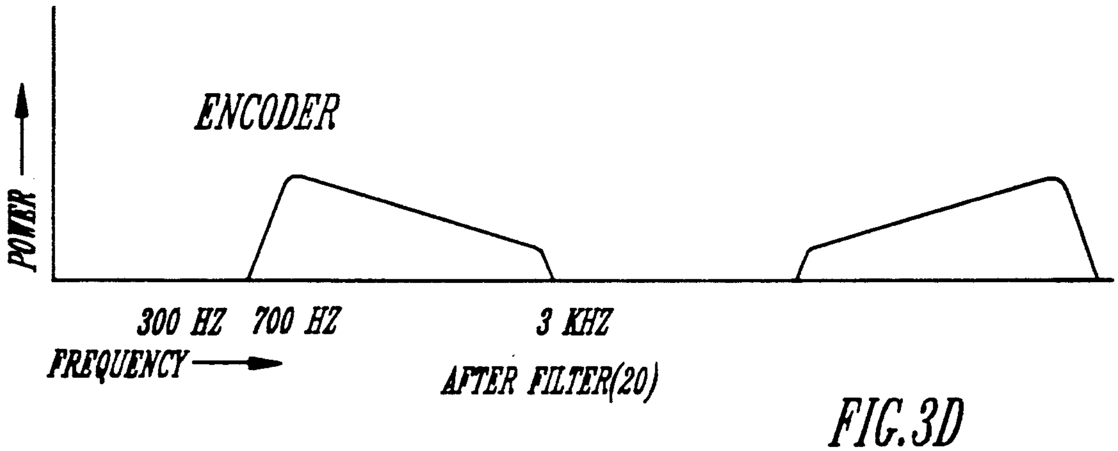
Figure 3E:
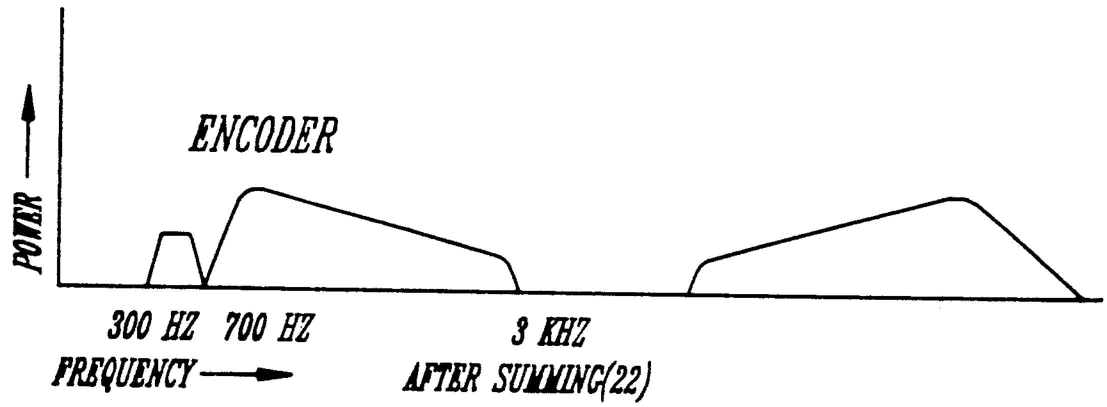
Figure 3F:
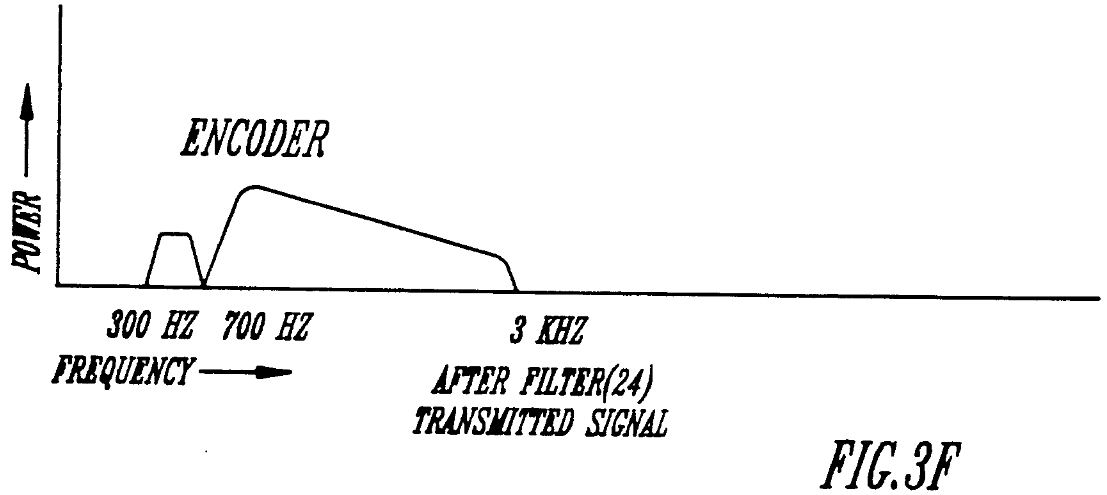

Inverter 18 receives the band limited audio signal (FIG. 3*b*) and scrambles or encrypts it (see FIG. 3*c*) by the psuedo-random switching of inverter 18 as controlled by frequency generator 28. Encryption algorithm 30 passes pseudo-random values to the frequency generator 28 which modify the frequency used to switch inverter 18. Therefore, as is well known in the art, analog scrambling of the audio signal is accomplished using time-varying, pseudo-random spectral modification. (As shown in FIG. 3*c*, the signal consists of an inverted 300 Hz to 2.8 kHz portion and a mirror image at substantially above 3 kHz. This is well known in the art.)

Encryption algorithm 30 additionally passes values to data transmitter 32 which are uniquely determined by current position in the pseudo-random sequence generated by encryption algorithm 30. Thus, the actual switching frequency of inverter 18 is correlated to the data transmitted by data transmitter 32.

In the preferred embodiment the data transmitter 32 creates a continuously updated continuous data signal made up of identifiable segments, each segment including a preamble, data sync pattern, and error correction, to create a continuously present data stream which modulates a carrier frequency (here 450 Hz). This modulated audio carrier is passed through low pass filter 34 to present a 300 to 600 Hz sub-band to summer 22.

The output of inverter 18 is passed through high pass filter 20 to present a 700 Hz to 2.8 kHz inverted signal and the higher frequency mirror image in a scrambled audio band (see FIG. 3*d*) to summer 22. Filter 20 removes sub 700 Hz encrypted audio frequencies which would interfere with the transmitted data in the 300–600 Hz sub-band.

Summer 22 adds the data in the sub-band to the scrambled audio band and passes the combined signal (see FIG. 3*e*) through low pass filter 24 to eliminate the high frequency mirror image of the inverted audio. A 300 Hz to 2.8 kHz merged band (scrambled audio plus sub-band data) is therefore output from encoder 10 (see FIG. 3*f*) where it can be modulated (for example, FM) to a conventional transmission carrier frequency by transmitter circuitry (not shown) such as is known in the art. Other post-encode modulation techniques are possible.

FIGS. 3(*a*)-(*f*) illustrate sequentially the signal processing of encoder 10. As shown in FIG. 3(*a*), the original audio signal occupies a wide band from 0 Hz and upwardly. After being band passed through filters 14 and 16 the signal would be generally as shown in FIG. 3(*b*). Inverter 18 would create mirror image versions of the signal of 3(*b*), as shown in FIG. 3(*c*) and as is well known in the art, by the periodical operation of inverter 18 on the band passed audio. Effective scrambling of the voice then is accomplished so that eaves droppers cannot understand the voice communication.

FIG. 3(*d*) illustrates removal of the 300 to 700 Hz portion of the inverted component of the signal by high pass filter 20. FIG. 3(*e*) then shows the addition of the 300–600 Hz sub-band component carrying data from data transmitter 32. FIG. 3(*f*) then shows the filtering of the summed signal by low pass filter 24 to leave the inverted audio signal and the sub-band signal carrying the data.

Encoder 10 therefore effectively sends data-on-voice transmissions including an audio signal unintelligible to casual eaves droppers and what is considered a sub audible (not within the normal audio band for this RF communication system) sub-band carrying continuous synchronization information. As can be seen, even though the sub-band data is continuously present, unlike bursts which cover the entire channel band, this sub-band would not interfere to any substantial extent with the audio portion of the signal, thereby being essentially transparent and maintaining good audio quality.

Figure 4A:
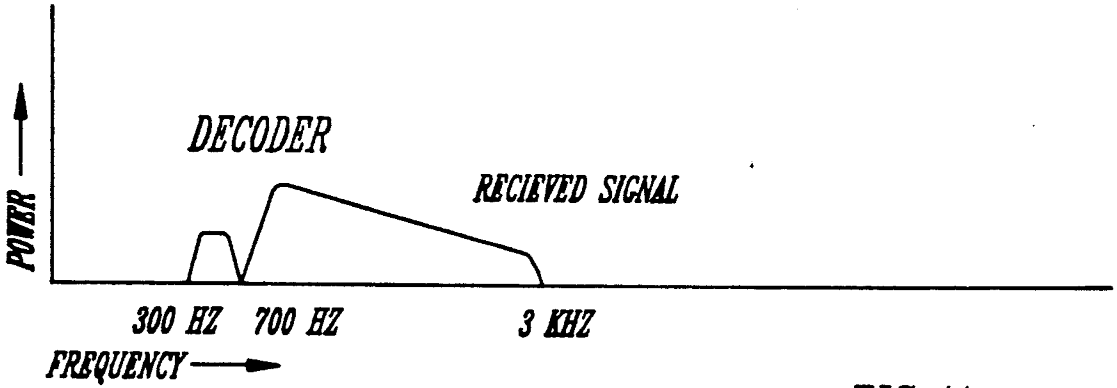
FIGS. 4(*a*)-(*d*) are diagrammatic depictions of signal plots illustrating signal processing in the decoder of FIG. 2.

After the conventional radio receiver (not shown) strips away the transmission carrier and demodulates the transmitted combined signal, decoder 40 in essence reverses the process of encoder 10. As shown in FIG. 2, the received combined scrambled (inverted) audio and sub-band data signal (see FIG. 4*a*) enters decoder 40 through high pass filter 42, which again removes signals below 300 Hz which are used for a control in many systems. It would also have removed any portion of the signal above 2.8 kHz. The high pass filtered combined signal is then split in two branches. A data recovery path extends through low pass filter 50 to effectively recover the 300 to 600 Hz sub-band carrying the modulated data. This portion of the signal is then fed through limiter 52 to what is called data recovery device 56, which recovers in digital form the transmitted data. This data is passed to decryption algorithm 58 in microprocessor 54 to synchronize decoder 40 with encoder 10, since the data is comprised of values that are uniquely determined by current position in the pseudorandom sequence that has been programmed into the encoder 10 and decoder 40. Decryption algorithm 58 in turn passes control values to frequency generator 20 based on the recovered data. Generator 60 then generates the correct decoded frequencies based on the control values and switches inverter 46 at the correct decode rate.

Figure 4B:
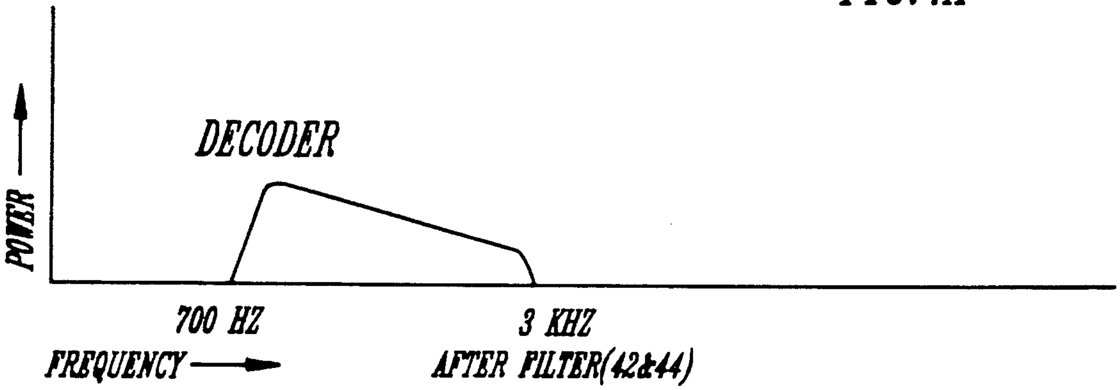
Figure 4C:
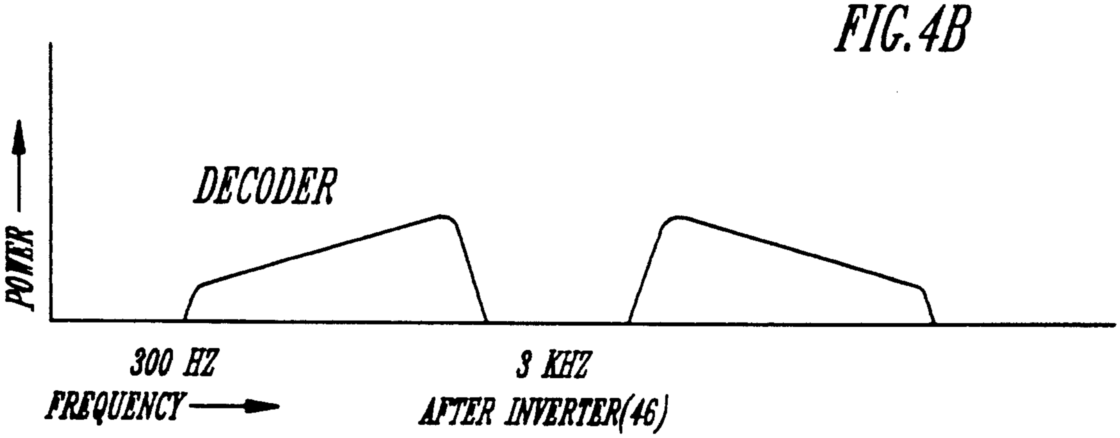
Figure 4D:
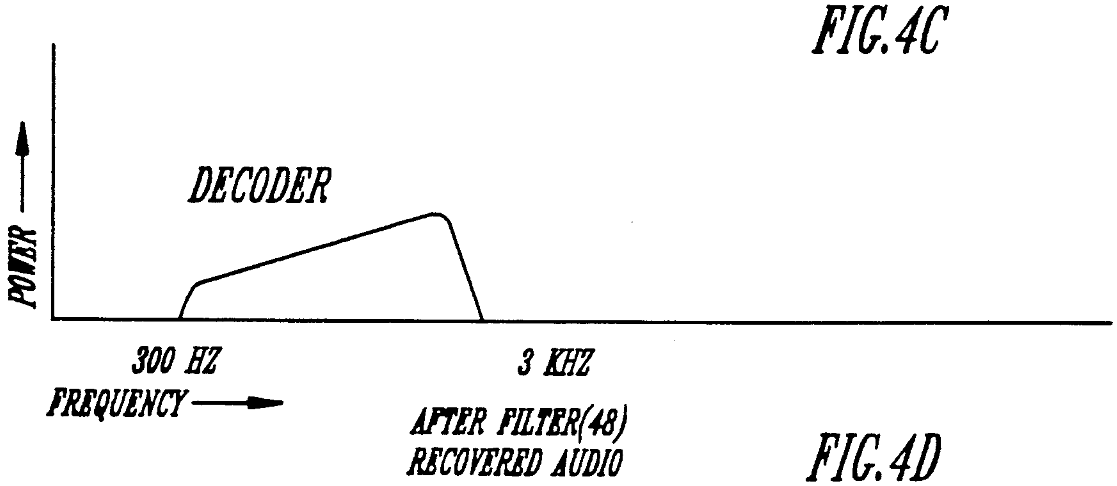

The combined received signal, after passage through high pass filter 42 (FIG. 4*a*), also takes what will be called an audio recovery path through high pass filter 44 to separate out the low sub-band containing the data and leave the inverted audio (see FIG. 4*b*). It then passes through inverter 46 which produces the mirror images of FIG. 4*c* (the 300 to 3000 Hz component representing a re-inversion of the audio back to its original state of FIG. 3*b*). After inverter 46, the signal passes through filter 48 to remove unwanted audio frequencies (the high frequency mirror image of FIG. 4*c*) above 2.8 kHz generated by inverter 46. A descrambled synchronized audio is then presented at the output of filter 48 and represents the output of decoder 40 (see FIG. 4*d*).

FIGS. 4(*a*) through (*d*) sequentially illustrate the decoding process. The combined scrambled audio and sub-band data signal received by decoder 40 is shown at FIG. 4(*a*). It is identical to FIG. 3(*f*). FIG. 4(*b*) shows how filter 44 deletes the sub-band and presents an inverted signal along the audio recovery path. FIG. 4(*c*) illustrates the output of inverter 46 whereby the mirror images (but inverted from FIG. 3*c*) of the signal of FIG. 4(*b*) are presented by inversion methods known to those skilled in the art. FIG. 4(*d*) shows the final unscrambled audio output after filter 48.

D. Options, Features, and Alternatives

It will be appreciated that the present invention can take many forms and embodiments. The true essence and spirit of this invention are defined in the appended claims, and it is not intended that the embodiment of the invention presented herein should limit the scope thereof.

For example, as previously discussed, the present invention is applicable to a variety of types of analog scrambling. Examples are frequency inversion scrambling, split-band scrambling, and rolling code scrambling. Others are possible. It is to be understood that the invention pertains to the utilization of a sub-band carrying continuously present synchronization information. The sub-band can be continuously transmitted with the audio scrambled signal without detrimental affect on the audio quality of the signal.

It is to be further understood that the sub-band in the preferred embodiment is shown as an essentially sub audible, segregated low side band to the audio signal. It alternatively could be placed at the top of or above the top of the audio band, or at any location in between. It therefore can be considered "data-on-voice" or "in-band" with the audio in the sense that audio could cover essentially 0 to 3000 Hz, but also considered "sub-audible" or "super-audible" if the sub-band was placed either above or below the audio band (e.g. sub-band at 300–600 Hz or 2700–3000 Hz and audio band is 700–2600 Hz). It clearly would be "in-band" if the sub-band were 1000–1300 Hz and the audio band 1000–3000 Hz.

Additionally, it is to be understood that the precise method of encryption or scrambling can vary. In the preferred embodiment the microprocessor controls an inverter for encoding and decoding. The method of encryption in the preferred embodiment is a pseudorandom generation system, such as are well known in the art. Precise functioning of the encryption and decryption algorithms is not essential to the invention and therefore is not described in detail. Furthermore, complete and detailed disclosure of such algorithms would compromise the security of communication systems utilizing the preferred embodiment of the present invention. One skilled in the art is able to understand the function of the encryption and decryption algorithms and make and use them. Essentially, the microprocessor(s) of the preferred embodiment is/are programmed with a pseudo-random sequence that repeats periodically (e.g. time intervals that are extremely long (hours or tens of hours) compared to the transmission times). This sequence is used to determine the frequency of inverter 18, and a correlated synchronization code is given to data transmitter 32. A data packet including the synchronization code is then continuously present on the transmitted signal from encoder 10 in its dedicated sub-band. The data packet can then be recovered from the decoder at any time to allow sync-up with the encoder.

Still further, the precise manner in which data is generated and presented in a form which can be merged as a sub-band into or with the scrambled audio signal can vary.

In the preferred embodiment, the microprocessor both generates and can decode the continuous data signal which includes synchronization information. The data signal is made up of identifiable segments called data packets. Each data packet (including the synchronization code) comprises the data that is modulated and summed with the scrambled audio in the encoder, and which can then be recovered and used in the decryption algorithm in the decoder. In the preferred embodiment the data is modulated into a 450 Hz carrier frequency by phase shift keying (PSK) such as is known in the art. Each bit of transmitted data consists of 5 half cycles of the 450 Hz carrier; i.e. two and one half cycles per bit. After a bit has been transmitted, the next bit to be transmitted is compared to the preceding bit. If the next bit is the same (0 or 1) as the preceding bit, no phase shift is made and the carrier continues for another $2\frac{1}{2}$ cycles. If not the same, the phase of the carrier is shifted 180 degrees. In other words, the level (high or low) of the carrier at the end of the preceding bit is held at the same level for the first half cycle of the 450 Hz carrier during transmission of the next bit.

At the decoder end, the low pass filter 50 separates the 450 Hz data carrier from the audio portion of the signal in the data recovery path. Limiter circuit 52 amplifies the level of the carrier to provide either zero volts or 5-volts at the input to the microprocessor. The decoder software in the microprocessor performs at two independent, (but interdependent) levels. First, a "carrier detect" portion of the software constantly searches for the 450 Hz carrier. By examining the input from the limiter 52 at timed intervals (10 times for each bit), the pattern for the carrier can be detected. After detecting the carrier the software and the microprocessor adjust the timing to maintain synchronization with the carrier.

Second, a "bit detect" portion of the software looks for phase shifts in the carrier. The software detects patterns in the data stream that indicate when a phase shift has occurred, and adjusts what is called bit edge detection (as known in the art) to match.

The synchronization code (or what sometimes is called the encryption key) in the preferred embodiment is 7 digits in length, the first digit being decimal and the six remaining digits hexadecimal. A combination of greater than 160 million codes is therefore possible. In addition, the programming in the microprocessor permits a selection of one of 32 synchronization codes. The decoder will not attempt to descramble unless it detects a proper synchronization code. This increases the number of codes to over 5 billion (160 million times 32). Additionally, both the upper and lower limits of the inversion frequency, as well as the dwell time on each individual inversion frequency are also programmable.

The data packet consists of a preamble, a synchronization information portion, and an error detection portion. The preamble is a series of 1, 0, 1, 0, 1, 0, . . . . This provides the decoder with a maximum number of bit edges (since each transition from bit to bit causes a phase shift). The decoder demodulates the data stream itself by comparing every other sample (five samples out of the last ten) from the limiter 52. It then uses a "majority" test to decode the bit as either a zero or a one. More accurately, it decodes the bit as either being the same as, or different from, the previous bit. Since the decoder can "lock on" to the bit edge on either phase of the carrier, the "first" decoded bit can be arbitrarily viewed as either a zero or a one. During synchronization, the software looks for either a "correlation" of the last 40 bits received when compared to the synchronization code (indicating that the bits were decoded in the correct phase; i.e. 1=0 and 0=0) or it looks for an "anti-correlation" (indicating that the bits were decoded in reverse phase; i.e. 1=0 and 0=1). A "correlated" match is triggered when at least 35 of the last 40 bits compare to the synchronization code. An "anti-correlated" match is triggered when no more than 5 of the last 40 bits compare to the synchronization code.

As will be understood by those skilled in the art, the data packet can therefore provide a synchronization code on a continuous basis that can accompany the scrambled audio signal. In direct comparison to synchronization bursts on a periodic basis, there are no significant time gaps between synchronization codes.

As further can be understood by those skilled in the art, the data packet also allows information regarding error correction or system identification to be transmitted in the data stream on a continuous basis.

In the preferred embodiment, the timer interrupt feature of the 6805 microprocessor is used to generate the inversion frequency for encoding and decoding. When scrambling, the microprocessor toggles one of its output pins each time a timer interrupt occurs. This output pin connects to a switch that, depending on the level of the output, selects either an original (input) audio signal or an alternate audio signal that is 180° out of phase with the original audio, thus inverting the audio signal. The interval between the toggles of the microprocessor output is the half cycle time of the inversion frequency. An internal variable controls this interval. Its value is actually the number of microprocessor clock cycles between interrupts.

Two other variables along with a 24 bit pseudo-random number generator control the rolling code aspect of the encryption. Upper and lower limits of inversion frequency can be defined in the programming.

At initial power on, and each successive time the microprocessor returns to a start condition, the microprocessor randomly selects an initial value for the variable controlling the inversion frequency. This can be done by reading the value of its free running timer. Upon that occurrence, it enters a receive subroutine. The microprocessor will exit from the receive subroutine on either of two conditions; (1) if a synchronization code is detected which indicates an incoming packet or (2) the PPT ("push-to-talk") button on the transmitter is activated. If the PPT switch is activated to exit from the receive subroutine, the microprocessor enters a transmit subroutine.

The transmit subroutine first performs housekeeping functions. It determines which of 32 possible synchronization codes is in use, as defined by the programming, and sets up a transmit buffer to send the selected code. It also uses information from the sync code or encryption key to select the taps to be used by the pseudo-random number generator, by selecting one of several available pseudo-random tap sets from an internal table. It also uses the microprocessor's free running counter to select a random value. The transmit subroutine then performs a "look-ahead" calculation based on the current values of variables and the pseudo-random number register. The purpose of the "look-ahead" calculation is to predict what the value of the variables will be one packet time (500 milli sec.) in the future. By doing this, it selects values for the variables that match the beginning of one packet to the end of the previous packet. This then eliminates any abrupt change in the inversion frequency variable from one packet to the next that would result in a noticeable "click" in the recovered audio. Once it has calculated the values for the variables it constructs the data packet that contains the values. It is these "predicted" values that the transmitter will begin to use for scrambling after it has transmitted the packet.

The transmit subroutine then begins sending the packet. When the microprocessor has completed transmission of the packet, it initiates (or continues) scrambling by using the just transmitted values of the variables. It then enters a subroutine which predicts a new set of values for the next data packet. This loop continues until release of the PTT switch. When release of the switch is detected, the microprocessor stops all scrambling and data transmission and returns to a start condition.

A timer interrupt subroutine initiates the actual scrambling. When the transmitter (or receiver) wishes to initiate scrambling, it does so by setting a sweep delay timer. This delay permits precise timing synchronization between the transmitter and receiver and allows the transmitter adequate time to perform its prediction calculations (and allows the receiver adequate time to decode a packet and set up its variables). At the end of each packet transmission the transmitter sends a two bit long inter-record gap which allows time for the calculations to occur. When the inter-record gap is being sent, the transmitter simply continues to send the data carrier without modulation. This allows the receiver to remain locked on the carrier while it is in the process of decoding the packet. The timer interrupt subroutine tests the sweep delay timer on each interrupt. When the timer is expired it moves the new values for variables to the appropriate sweep variables. It also uses information from the sync code to initialize a pseudo-random number register.

At the receive end, the decoded packet furnishes the new values for the variables. The microprocessor then sets the sweep delay timer just as it does in the transmit mode, and the timer interrupt subroutine initiates descrambling at the proper time.

In the preferred embodiment the timer interrupt subroutine handles both sending and receiving data and inversion generation simultaneously. The coding of the timer interrupt subroutine is such that it will resolve any conflict between data time and sweep time in favor of sweep time. In other words, if both the sweep time and data modulation and demodulation transition are due at the same time, the microprocessor handles the sweep transition first. This prevents unwanted "glitches" on the inversion signal that can result in reduced recovered audio quality.

It will be understood by those skilled in the art that the above described functions can be carried out in the circuitry of the preferred embodiment by utilizing appropriate software with the microprocessor. Other configurations are possible in which encryptions are possible in which encryption and decryption are carried out where the transmitted scrambled audio signal is combined with a sub-band component carrying synchronization data or information on a continuous basis.

Still further, it is to be understood that the present invention can extend to a variety of applications where an audio signal is scrambled, transmitted, and descrambled. Examples are cellular telephone and conventional telephone. Others are possible. In these cases, the audio signal is presented to the encoder by some sort of analog audio signal converting device, it is scrambled, and continuous synchronization information is combined with the scrambled audio. The combined scrambled audio/continuous synchronization information is then transmitted by some type of transmitting device, (e.g. a radio transmitter which modulates the combined signal onto a carrier, by AM, FM, or other techniques, a cellular telephone system, or a conventional telephone system).

To receive and understand the transmission, it must be processed, first, to demodulate it from its carrier, or otherwise convert it back to the combined signal alone, and then remove and use the synchronization information to allow descrambling of the scrambled audio; where it can then be utilized (for example, passed to appropriate circuitry (not shown) and ultimately a speaker to regenerate the original voice message.

We claim:

1. A method of transmitting communications which are scrambled comprising:

scrambling an audio signal that is used to modulate a transmission RF carrier;

generating a continuous synchronization signal correlated to the scrambling of the audio signal;

combining the synchronization signal with the audio signal; and so that the synchronization signal can be continuously transmitted with the audio signal to allow immediate initialization synchronization and continuous synchronization as long as the audio signal is transmitted.

2. The method of claim 1 wherein the transmission RF carrier is used in conventional telephone communications.

3. The method of claim 1 wherein the transmission RF carrier is used in radio communications.

4. The method of claim 1 wherein the transmission RF carrier is used in cellular telephone communications.

5. The method of claim 1 wherein the scrambling comprises spectral modification of the audio signal.

6. The method of claim 1 wherein the audio signal is band-passed prior to scrambling.

7. The method of claim 6 wherein the band passing removes control information utilized by some audio transmission systems.

8. The method of claim 5 wherein the scrambling comprises frequency inversion which utilizes a switching means which is switched according to a pseudo-random sequence.

9. The method of claim 1 wherein generation of the synchronization signal comprises generating data correlated to scrambling of the audio signal.

10. The method of claim 9 wherein the data is modulated to a data RF carrier frequency.

11. The method of claim 10 wherein the data RF carrier frequency is sub-audible in comparison to the audio signal.

12. The method of claim 9 wherein the data is put into a continuous data stream and made up of segments.

13. The method of claim 12 wherein the segments include a preamble, a synchronization code, and an error correction code.

14. The method of claim 10 further comprising combining the scrambled audio signal and the PSK modulated data RF carrier into a combined radio frequency band for transmission.

15. The method of claim 14 wherein the combined radio frequency band is modulated on the transmission RF carrier.

16. The method of claim 14 wherein the modulated synchronization signal comprises a sub-band of the scrambled audio signal.

17. The method of claim 14 further comprising filtering the combined scrambled audio and modulated signal prior to transmission.

18. The method of claim 1 further comprising decoding a transmitted signal by separating the sub-band from the radio frequency band containing the scrambled audio signal and the modulated synchronization signal, recovering the audio signal from the scrambled audio signal, and recovering data from the sub-band.

19. The method of claim 18 wherein the recovered data from the sub-band is utilized to synchronize the recovery of the audio from the scrambled audio.

20. The method of claim 19 wherein the recovered audio is output to a receiver.

21. An audio communication system comprising:

at least one transmitter including an encoder;

at least one receiver including a decoder;

the encoder comprising an audio band scrambler; a sub-band generator which produces a frequency band which carries synchronization information on a continuous basis, and a combiner to combine the audible and sub-bands for transmission output;

the decoder comprising a separator to separate the audio and sub-bands, a synchronization information recovery device to recover the synchronization information, and an audio recovery device which utilizes the synchronization information to recover the audio communication.

22. The system of claim 21 wherein the transmitter and receiver are combined in a transceiver.

23. The system of claim 21 wherein the audio band scrambler includes a device to scramble an analog audio signal using time-varying, pseudo-random spectral modification.

24. The system of claim 23 wherein the audio band scrambler includes a frequency inverter device and a control device which generates a switching signal to operate the inverter in a pseudo-random fashion.

25. The system of claim 24 further comprising a microprocessor which includes an encryption algorithm to instruct the control device regarding generation of the switching signal.

26. The system of claim 21 wherein the sub-band is narrower than the audio band.

27. The system of claim 26 wherein the sub-band is in-band with the audio band.

28. The system of claim 26 wherein the sub-band is effectively sub-audible.

29. The system of claim 26 wherein the sub-band is effectively super-audible.

30. The system of claim 26 wherein the sub-band carries synchronization information by modulating data on a data carrier in a relatively narrow frequency band.

31. The system of claim 21 wherein the combiner comprises a summer device.

32. The system of claim 21 wherein the separator comprises frequency filters which pass selected frequency bands.

33. The system of claim 21 wherein the synchronization information recovery device includes a limiter and a data recovery decoder.

34. The system of claim 21 wherein the audio recovery device includes an inverter, a frequency generator which issues a switching signal to the inverter, and a microprocessor including a decryption algorithm.

35. A method of audio communication comprising:

scrambling an audio signal that is used to modulate a radio frequency signal;

combining with the audio signal data modulated to a frequency sub-band within the audio signal.

36. The method of claim 35 wherein the scrambling comprises analog scrambling using time varying pseudo-random spectral modification.

37. The method of claim 36 wherein the audio signal is generally of a band that includes a portion of the audible spectrum.

38. The method of claim 35 wherein the data includes synchronization information.

39. The method of claim 38 wherein the data includes error correction information.

40. The method of claim 38 wherein the data includes identification information.

41. The method of claim 35 wherein the frequency sub-band containing the data is a relatively low frequency within the audio band.

42. The method of claim 35 wherein the frequency sub-band containing the data is a relatively low frequency immediately below the audio band and is effectively a sub-audible band.

43. The method of claim 35 wherein the frequency sub-band containing the data is a relatively high frequency band within the audio band.

44. The method of claim 35 wherein the frequency sub-band containing the data is a relatively high frequency immediately above the audio band and is effectively super audible.

45. The method of claim 35 wherein the frequency band containing the data is a relatively narrow band within the audio signal.

46. The method of claim 35 wherein the data is modulated in the sub-band by PSK signalling.

* * * * *